W. TRABUE.
AUTOMOBILE ATTACHMENT
APPLICATION FILED NOV. 1, 1920.
1,386,913.
Patented Aug. 9, 1921.
2 SHEETS—SHEET 1.
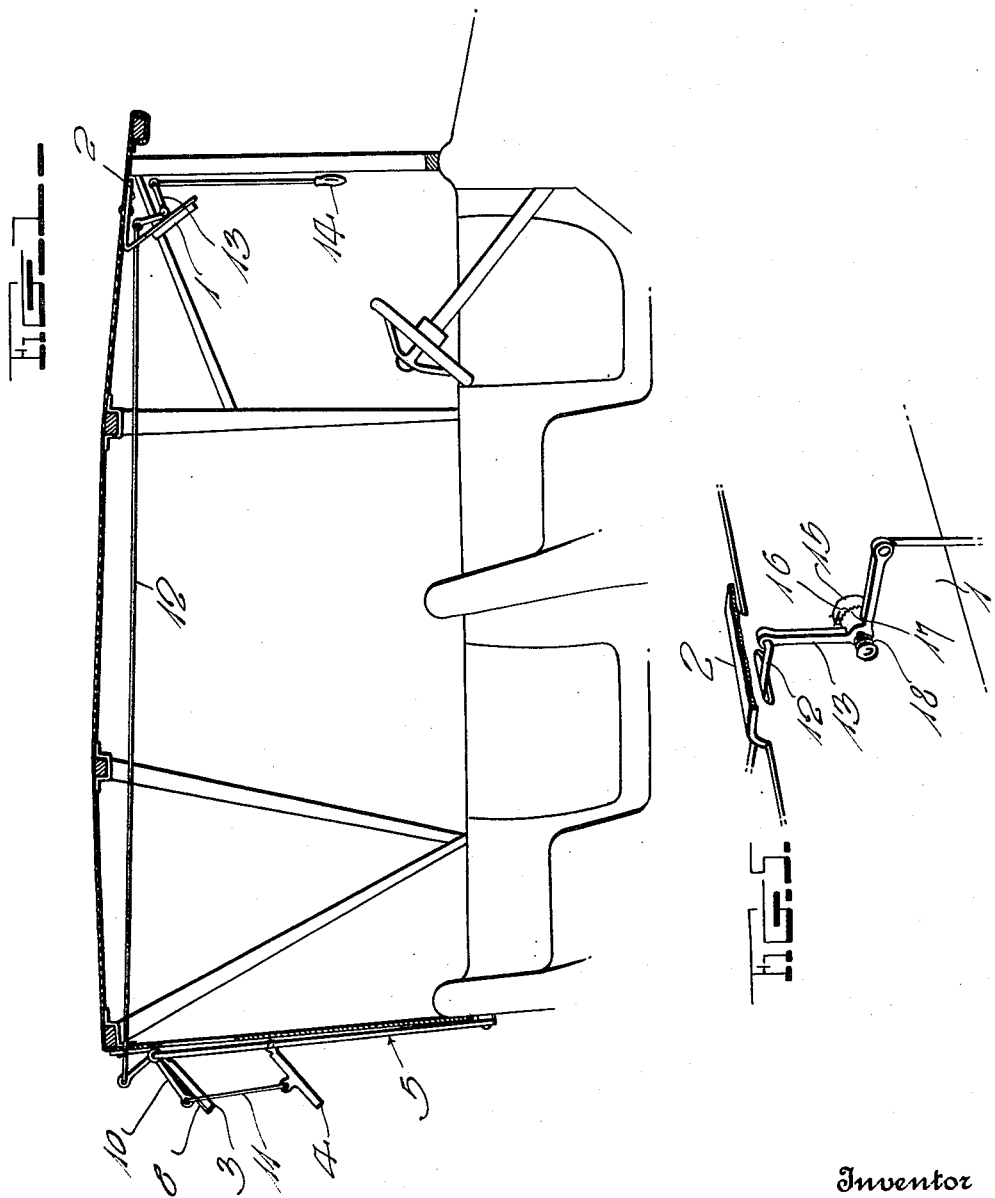
Witness
H. Woodard
Inventor
W. TRABUE
By H. B. Wilson & Co.
Attorneys

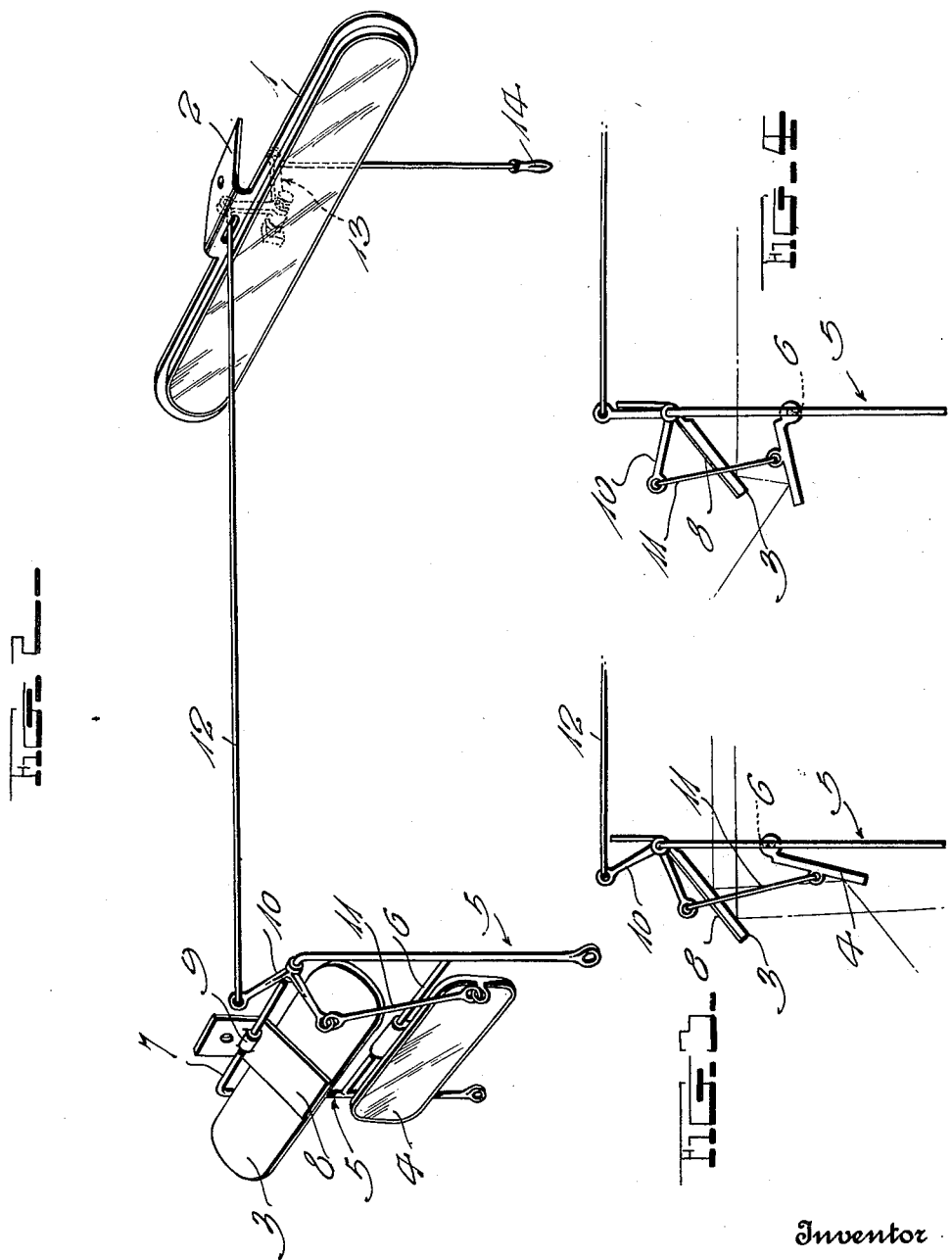

UNITED STATES PATENT OFFICE.

WILLIAM TRABUE, OF LOUISVILLE, KENTUCKY, ASSIGNOR OF ONE-HALF TO D. C. BRENNER, OF LOUISVILLE, KENTUCKY.

AUTOMOBILE ATTACHMENT.

1,386,913.  Specification of Letters Patent.  Patented Aug. 9, 1921.

Application filed November 1, 1920. Serial No. 421,137.

*To all whom it may concern:*

Be it known that I, WILLIAM TRABUE, a citizen of the United States, residing at Louisville, in the county of Jefferson and State of Kentucky, have invented certain new and useful Improvements in Automobile Attachments; and I do declare the following to be a full, clear, and exact description of the invention, such as will enable others skilled in the art to which it appertains to make and use the same.

This invention relates to attachments for automobiles, and has more particular reference to a combination of mirrors, one to be attached to the car's roof, in front of the driver's seat, and one or more at the rear end of the automobile, all of the mirrors being so positioned that the images of objects appearing on one of the mirrors will be reflected on the elongated mirror attached to the car's roof in front of the driver, whereby he may determine the surroundings in the rear and on opposite sides of his machine without turning his head as ordinarily done.

Another object of the invention is to provide an attachment of the above mentioned type embodying mirrors which are so positioned that the operator may determine whether his rear light is burning at night, due to the fact that the image of the light will appear in the mirror in front of him. This is extremely advantageous because on machines using oil tail-lights, this light oftentimes goes out and the driver has no knowledge of it being out.

A further object of the invention is to provide an attachment embodying a plurality of mirrors, one of which is adjustably mounted and is controllable from the operator's seat, this adjustable mounting of the mirror permitting it to be moved to various positions to receive the images of objects at various ranges in rear of the machine.

Other objects and advantages of the invention will be apparent during the course of the following description.

In the accompanying drawings, forming a part of this specification and in which like numerals are employed to designate like parts throughout the same:

Figure 1 is a view of a portion of an automobile showing my improved attachment in operative position thereon.

Fig. 2 is a perspective view of an attachment constructed in accordance with my invention.

Figs. 3 and 4 are detail views showing the movable mirror in different adjusted positions.

Fig. 5 is a detail view of a portion of the mounting of the attachment, showing the clutch device which serves to retain the movable mirror in various adjusted positions.

Referring to the drawings, wherein the preferred embodiment of my invention is clearly illustrated, it will be seen that the numeral 1 designates a stationary elongated mirror which is designed to be attached to or adjacent to the roof of the car in front of the driver, so that the images appearing therein may be readily seen by him. In the showing, this mirror includes an attaching bracket 2 which is especially constructed for connection to the underface of the top. This attaching bracket need not be of the construction shown and will vary according to the position in which this mirror is desired to be mounted. Arranged at the rear of the machine, preferably on the exterior and immediately over the rear window, is a second mirror 3, which like the mirror 1, is stationary, although, it may be movably mounted if found necessary or desirable. Mirror 3 is so positioned that its reflecting surface is turned toward the ground. A rear view of the machine will be reflected in this mirror and will in turn be reflected in the mirror 1. Furthermore, at night the tail-light will appear in the mirror 1, having been reflected to it by the mirror 3, thus the advantageous feature of determining when the tail-light is lighted and when it is out, is obtained with the employment of these two mirrors alone.

It is oftentimes desirable to obtain a view disclosing the immediate or distant surroundings at the rear of the machine. To this end, I employ a third mirror 4 which is positioned beneath the mirror 3 and is movably mounted. The employment of the adjustably mounted mirror 4 is advantageous when it is found desirable to reverse the machine and there is a considerably small amount of space to carry this out. It is customary for the operator to turn his head in order to determine just how much space he has to reverse his machine, especially in cases where another machine is close to the rear of his machine. With the arrangement of mirrors that I employ, this exceedingly bad practice is entirely overcome, since it is possible to obtain a view of the rear surroundings or circumstances in the mirror in front of the driver. At this point, I wish to mention that the mirror 1 is of a length to extend beyond the opposite vertical edges of the windshield, this particular length being employed in order to obtain reflections of the rear surroundings and images of objects on opposite sides of the machine. Thus, this mirror when used alone will be found advantageous.

Any suitable means may be employed for mounting the mirrors. According to the showing, I make use of a substantially U-shaped frame 5 which I position on the exterior of the down-turned portion of the automobile top, this frame including a horizontal cross-piece 6 on which the mirror 4 is pivotally mounted. The connecting portion 7 thereof serves as a means for mounting the mirror 3 which carries an L-shaped attaching member 8 including a tubular bearing 9 at the juncture of its long and short arms. This frame or bracket constitutes the means for supporting the two mirrors 3 and 4 at the rear end of the machine, and the bracket 2 as before indicated, constitutes the attaching and supporting means for the remaining mirror. In order to impart movement to the adjustable mirror 4, I employ a bell-crank lever 10 and rotatably mount it on the connecting portion 7 of said U-frame, one of the arms of this bell crank lever having connection with the movable link 11. Extending from the remaining arm of the bell crank lever is a horizontal substantially long link 12 which is connected at its opposite ends with an arm of an additional bell crank lever 13, the operating handle 14 being connected with the remaining arm of the last named bell crank lever. It is to be noted that the operating handle is extended downwardly across the windshield and is so arranged that it is in convenient operating distance of the driver, thus enabling him to manipulate the adjustable mirror with the least possible trouble. For the purpose of supporting the bell-crank lever 13 and providing the desired clutch means, I equip the mirror 1 on its ineffective side with a lug 15. This construction and arrangement can better be seen in Fig. 5. By referring to this figure, it will be seen that said lug is provided with teeth 16 which coact with teeth 17 constituting a part of the bell-crank lever 13. These members 16 and 17 serve as a clutch which in turn serves to retain the mirror 5 in various adjusted positions, as is obvious. If desirable, the lug may be provided with a headed stem and a coiled spring 18 may surround it, thus providing a novel clutch.

The operation of the device is as follows: Assuming that it is only desirable to obtain the image or object of the tail-light for instance, it is not necessary to move or adjust the mirror 4, since this mirror does not function in receiving the reflection of objects in the immediate vicinity of the rear end of the machine. In other words, when it is desirable to obtain a view of the rear end of the machine, the mirror 4 can be moved to a substantially virtical position approximating that illustrated in Fig. 2. However, if it is found desirable to obtain a view of surroundings which are not close to the rear end of the machine, this can be done by manipulating the adjustable mirror. An idea of just how the mirror 4 is adjusted, may be obtained by referring to Figs. 3 and 4, where lines of indications are shown to illustrate the position that this mirror should be moved to in order to obtain images or reflections of objects rather close to the machine (as shown in Fig. 3) or a considerable distance from the machine on hills and the like (as indicated in Fig. 4). It is, of course, obvious that in order to move the mirror 4, it is only necessary to operate the actuating member of handle 14, which through the medium of the links and bell crank levers imparts movement to this mirror 4. Also, as before intimated, the mirror 4 will be retained in any position to which it is adjusted by means of the clutch member which is made up of the parts 16 and 17.

A careful consideration of the foregoing description taken in connection with the accompanying drawings, is thought to be sufficient to enable persons skilled in the art to which this invention relates, to obtain a clear understanding of the same. Therefore, a more lengthy description is deemed unnecessary.

Since probably the best results may be obtained with the construction and arrangement of parts shown and described, I take this construction and arrangement as the preferred embodiment of my invention. However, I wish it to be understood that various minor changes in the shape, size, and arrangement of parts may be resorted to without departing from the spirit of the invention or the scope of the subjoined claims.

I claim:—

1. In a motor vehicle, the combination of a stationary elongated mirror attached to the car's roof in front of the driver's seat, a second stationary mirror supported at the rear of the vehicle in a position to reflect images through the usual rear window onto said first mirror, and a third adjustably mounted mirror disposed beneath the second mirror for reflecting objects onto the latter.

2. In a motor vehicle, the combination of an elongated mirror attached to the car's roof in front of the driver's seat, a second mirror supported at the rear of the vehicle in a position to reflect views on the first mirror, and a third mirror pivotally mounted at the rear of the vehicle beneath the second mirror to reflect images on the latter, linkage connected to the third mirror and extending forwardly, an operating handle connected to the linkage in a position to be conveniently actuated by the driver, and means for retaining the last named mirror in various adjusted positions.

3. A motor vehicle attachment of the type described comprising a U-shaped supporting frame to be attached to the downturned portion of the vehicle top, the same including a horizontal rod, an inclined mirror connected to the connecting portion of said frame, a second mirror pivotally mounted on the horizontal rod, a bell-crank lever carried by the frame, a link connected to said second mirror and to one of the arms of said lever, a supporting lug at the front of the vehicle, a bell crank lever on this lug, a connection between this lever and the first lever, an operating member also connected to the second named lever, means for holding the movable mirror in a set position, and a third mirror attached to the car's roof in front of the driver's seat for receiving images from the other two mirrors.

In testimony whereof I have hereunto set my hand.

WILLIAM TRABUE.